United States Patent
Nagamachi

(10) Patent No.: US 7,651,026 B2
(45) Date of Patent: Jan. 26, 2010

(54) ARTICLE INFORMATION DISPLAY SYSTEM AND ELECTRONIC SHELF LABEL

(75) Inventor: Takeshi Nagamachi, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 308 days.

(21) Appl. No.: 11/449,789

(22) Filed: Jun. 8, 2006

(65) Prior Publication Data

US 2006/0283942 A1    Dec. 21, 2006

(30) Foreign Application Priority Data

Jun. 15, 2005    (JP) .............................. 2005-175239

(51) Int. Cl.
 *G06K 15/00* (2006.01)
(52) U.S. Cl. .................. 235/383; 235/378; 235/385
(58) Field of Classification Search ................. 235/383, 235/385, 378, 375, 492; 705/16, 21
See application file for complete search history.

(56) References Cited

U.S. PATENT DOCUMENTS

| | | | |
|---|---|---|---|
| 5,880,449 A | | 3/1999 | Teicher et al. |
| 6,098,049 A | * | 8/2000 | Goodwin et al. ............... 705/21 |
| 6,715,676 B1 | * | 4/2004 | Janning ....................... 235/383 |
| 6,876,975 B1 | * | 4/2005 | Zimmerman et al. .......... 705/20 |
| 6,897,763 B2 | * | 5/2005 | Schulmerich et al. ...... 340/5.91 |
| 6,959,862 B2 | * | 11/2005 | Neumark ..................... 235/385 |
| 2002/0062254 A1 | * | 5/2002 | Matsko ........................ 705/20 |
| 2003/0122857 A1 | | 7/2003 | Marion |

FOREIGN PATENT DOCUMENTS

| | | |
|---|---|---|
| CN | 2355374 Y | 12/1999 |
| EP | 1 176 532 | 1/2002 |
| JP | 7-271862 | 3/1994 |
| JP | 2001-209861 | 11/1999 |

OTHER PUBLICATIONS

Communication from European Patent Office re: related application.
Communication from Chinese Patent Office (with English translation) regarding related application dated Jul. 18, 2008.

* cited by examiner

*Primary Examiner*—Seung H Lee
(74) *Attorney, Agent, or Firm*—Harness, Dickey & Pierce, P.L.C.

(57) ABSTRACT

A fingerprint detecting portion which detects a fingerprint, which is a physical characteristic inherent to an individual, is provided on an electronic shelf label. A display control device has a customer database in which fingerprint data items of respective customers are formed in a database form. A customer is specified by referring to the customer database by use of fingerprint data detected by the fingerprint detecting portion of the electronic shelf label. Then, the electronic shelf label which has detected the fingerprint data acquires a user price of the customer for a corresponding article. The user price is displayed on a selling price display portion of the electronic shelf label.

4 Claims, 9 Drawing Sheets

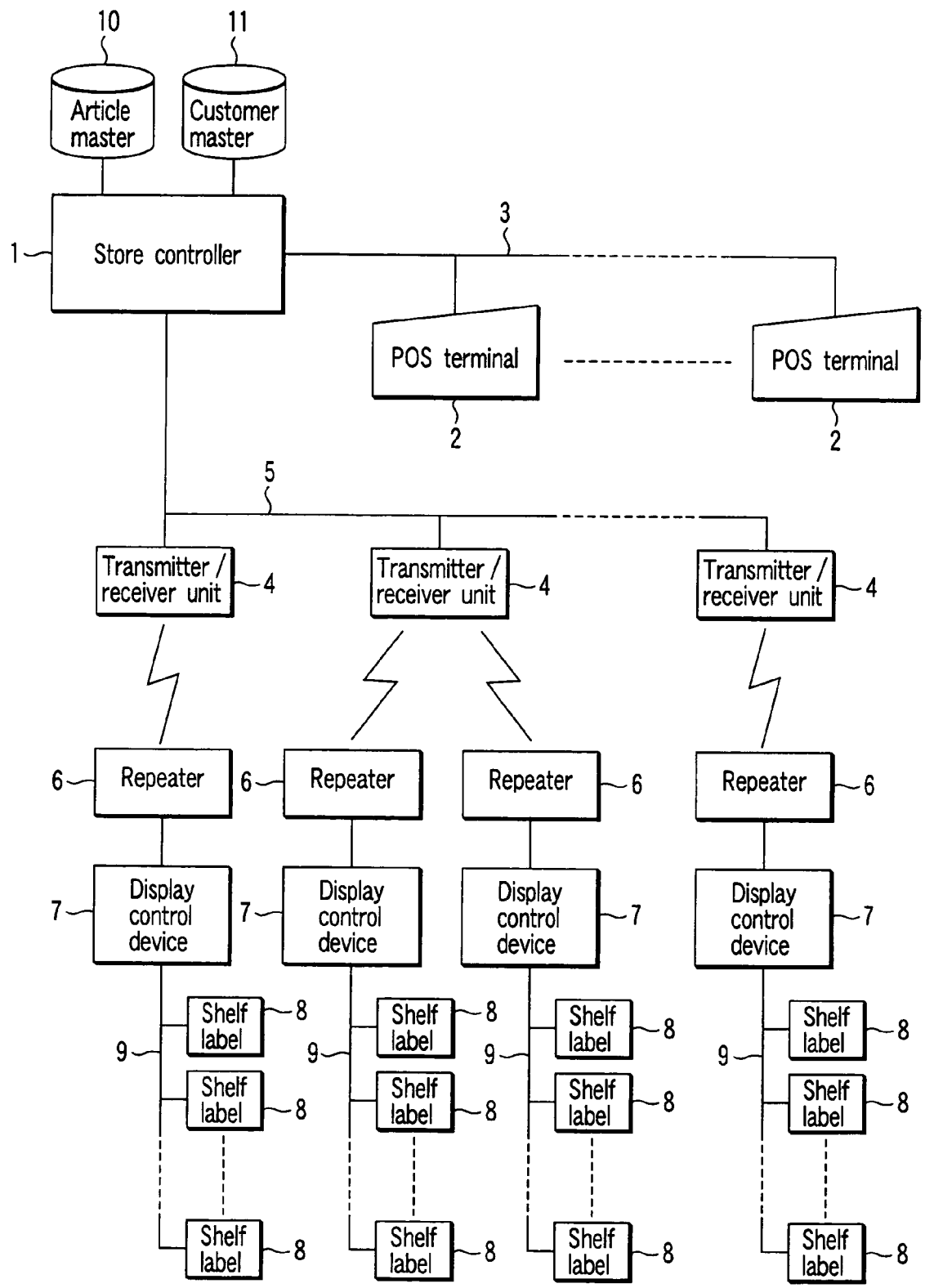
F I G. 1

| 41 | | | | |
|---|---|---|---|---|
| Shelf label ID | Shelf label I/F No. | Article name | List price | Selling price |
| A01 | 01 | Liquid crystal television | 298,000 | — |
| A02 | 02 | Liquid crystal television | 288,000 | — |
| A03 | 03 | Liquid crystal television | 278,000 | — |
| ⋮ | ⋮ | ⋮ | ⋮ | ⋮ |
| A99 | 99 | — | — | — |

| 42 | | |
|---|---|---|
| Shelf label ID | Accumulated points | Display time |
| A01 | 0 | 0 |
| A02 | 0 | 0 |
| A03 | 0 | 0 |
| ⋮ | ⋮ | ⋮ |
| A99 | 0 | 0 |

FIG. 6

| Customer rank | Discount rate % |
|---|---|
| A | 30 |
| B | 25 |
| C | 20 |
| D | 18 |
| ⋮ | ⋮ |
| J | 0 |

ARTICLE INFORMATION DISPLAY SYSTEM AND ELECTRONIC SHELF LABEL

CROSS-REFERENCE TO RELATED APPLICATIONS

This application is based upon and claims the benefit of priority from prior Japanese Patent Application No. 2005-175239, filed Jun. 15, 2005, the entire contents of which are incorporated herein by reference.

BACKGROUND OF THE INVENTION

1. Field of the Invention

This invention relates to an electronic shelf label provided on an article display shelf, and an article information display system using electronic shelf labels.

2. Description of the Related Art

In Jpn. Pat. Appln. KOKAI Publication No. 2001-209861, an article information display system which uses electronic shelf labels and can electronically rewrite article information of the shelf label from a remote place is disclosed. By using the system, for example, the price display of the electronic shelf label can be changed at the time of price change of an article for special sale on a real time basis.

In Jpn. Pat. Appln. KOKAI Publication No. H7-271862, an article information display system having shelf labels provided on the display shelf and an information display device provided independently from the display shelf is disclosed. The information display device is placed near the article display shelf on which articles on special sale are displayed. A strong appeal cannot be made to the customers only by the price change of the shelf label at the time of price change for special sale. A strong appeal can be made to the customers by displaying special sale information on a large scale on the information display device.

In recent years, in most of the distribution retail businesses, a point-service system is introduced in order to corral the customers. In this system, points are given to the customers according to the sales amount. The thus given points are accumulated for each customer. The accumulated points are each converted into the amount of money, and used for payment of the price for a purchased article or the like.

The customer may want to get information on the actual price of an article when accumulated points are used for payment of the article. However, with the conventional technique, the price derived based on the performance or the like of the customer or so-called user price cannot be displayed on the electronic shelf label.

BRIEF SUMMARY OF THE INVENTION

An object of this invention is to provide an article information display system which displays a user price or the like for a customer on an electronic shelf label for the customer who faces the electronic shelf label.

According to one aspect of this invention, there is provided an article information display system which comprises a plurality of electronic shelf labels provided for respective articles displayed on an article display shelf, and a display control device which controls display information of the electronic shelf labels, wherein each of the electronic shelf labels includes a detecting portion which detects information inherent to an individual and the display control device includes a storage portion which stores information inherent to each customer, a customer specifying portion which specifies a customer by referring to the storage portion by use of inherent information detected by the detecting portion of the electronic shelf label, an information acquiring portion which acquires information displayed for the customer specified by the customer specifying portion, and a display control portion which causes information acquired by the information acquiring portion to be displayed on the electronic shelf label in which information inherent to the customer specified by the customer specifying portion is detected.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a store system according to one embodiment of this invention;

FIG. 6 is a schematic diagram showing the data structure of a shelf label display management table and selling price display management table formed in a RAM of the display control device in the above embodiment;

DETAILED DESCRIPTION OF THE INVENTION

Figure 2:
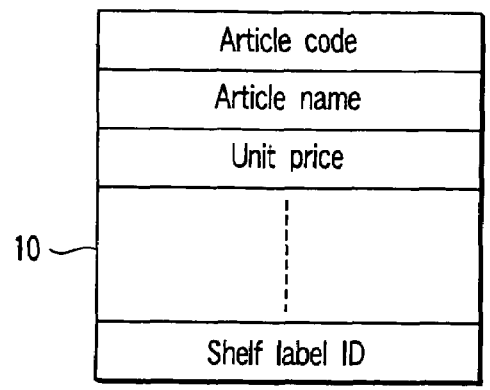
FIG. 2 is a schematic diagram showing the main data structure of an article master table in the above embodiment.

There will now be described preferable embodiments of this invention with reference to the accompanying drawings.

First, a first embodiment of this invention is explained. The embodiment indicates a case wherein an article information display system according to this invention is applied to a sales store in which the point-service system is introduced.

FIG. 1 is a configuration diagram of a system configured in the sales store in the present embodiment. A store controller 1 which processes various information items relating to the store is installed in a management office of the store, for example. A plurality of point-of-sales (POS) terminals 2 are connected to the store controller 1 via a communication line 3.

Each POS terminal 2 which processes various information items relating to the article sale is installed in the accounting location of the store or the like. Each POS terminal 2 is a known terminal which corresponds with the present point-service system.

A plurality of radio transmitter/receiver units 4 are connected to the store controller 1 via a communication line 5. Each radio transmitter/receiver unit 4 is attached to the ceiling or the like of the sales room.

Each radio transmitter/receiver unit 4 transmits/receives data with respect to one or a plurality of repeaters 6 by radio. Display control devices 7 are connected in one-to-one correspondence to the repeaters 6.

Each display control device 7 is provided in correspondence to one or a plurality of article display shelves (not shown). Electronic shelf labels 8 are attached to the article display shelf in one-to-one correspondence to articles displayed thereon. The electronic shelf labels 8 are connected to the display control device 7 of the article display shelf via a communication line 9.

The communication lines 3, 5 and 9 can be realized by a wire or radio by using electromagnetic waves, infrared rays or the like.

Figure 3:
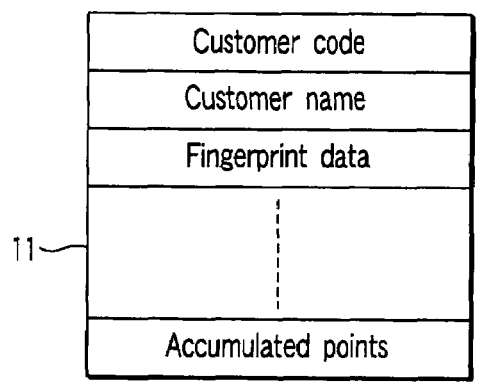
FIG. 3 is a schematic diagram showing the main data structure of a customer master table in the above embodiment.

An article master table 10 and customer master table 11 are provided on the store controller 1. As shown in FIG. 2, article information such as an article code, article name, unit price, shelf label ID and the like is stored in the article master table 10. As shown in FIG. 3, customer information such as a customer code, customer's name, fingerprint data, accumulated points and the like is stored in the customer master table 11.

The article code is inherent information set for each article to identify each article. The shelf label ID is inherent information set for each shelf label to identify each electronic shelf label 8. In the article master table 10, the shelf label IDs of the electronic shelf labels 8 set in the article display location specified by the article codes are stored in correspondence to the article codes of the respective articles.

The customer code is inherent information set for each customer to identify each customer. The fingerprint data is biometrics information indicating the physical characteristic of the customer. In the customer master table 11, for example, fingerprint data items of the index finger of the right hand of customers specified by the customer codes are stored in correspondence to the customer codes of the respective customers.

The total of accumulated points indicates an accumulated value of service points given to the customer according to the sales amount for each sale of an article. In the customer master table 11, the total of accumulated points at the present time of each customer specified by the customer code is stored in correspondence to the customer code of each customer. In the present embodiment, the accumulated points are converted into one yen for each point and can be used for payment for an article.

The article master table 10 and customer master table 11 are formed on a storage device such as a Hard Disk Drive (HDD) or the like. The storage device may be contained in the store controller 1 or attached thereto from the exterior.

Figure 4:
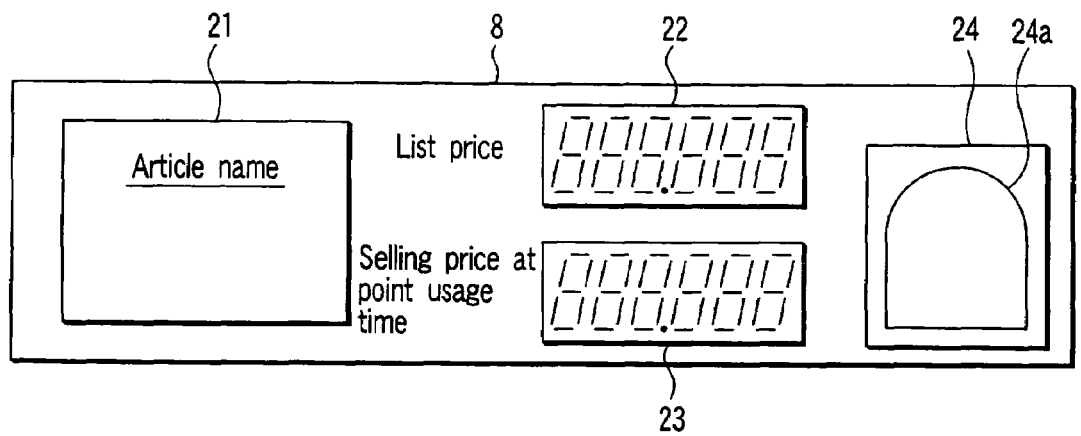
FIG. 4 is a plan view showing the front-face configuration of an electronic shelf label in the above embodiment.

FIG. 4 is a front view of the electronic shelf label 8. The electronic shelf label 8 contains a primary battery as a drive source. On the front surface of the electronic shelf label 8, an article name display portion 21, list price display portion 22, selling price display portion 23 and fingerprint detecting portion 24 are provided.

The fingerprint detecting portion 24 detects fingerprint data which is information inherent to an individual. The fingerprint detecting portion 24 causes a photographing device to photograph a fingerprint surface of a finger pressed against an area 24a. Then, it processes the image data and detects fingerprint data. The fingerprint detecting portion 24 may be configured to detect fingerprint data by use of a light diffusion type semiconductor fingerprint reading sensor. The electronic shelf label 8 may use a solar battery, super capacitor or the like as a drive source.

Figure 5:
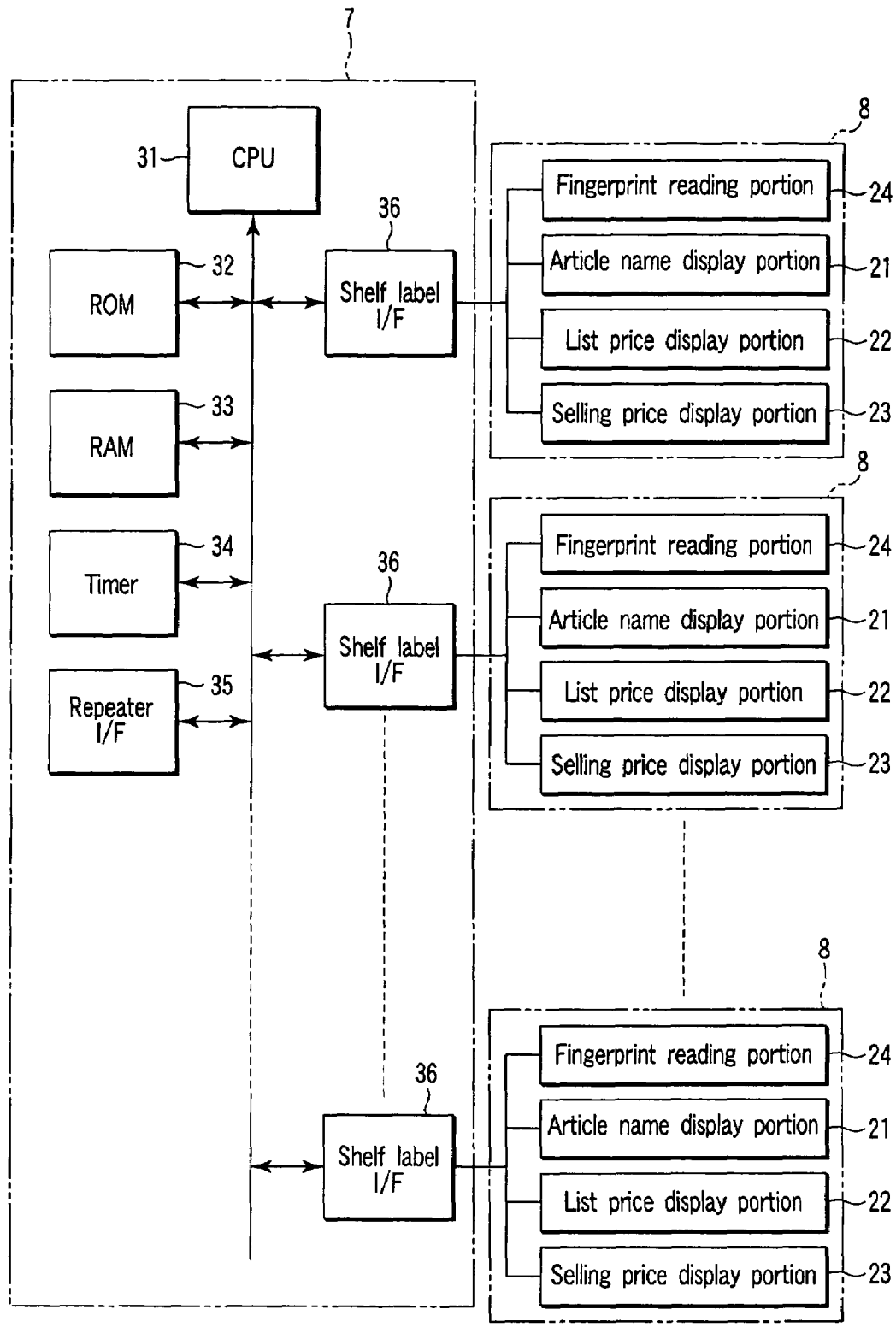
FIG. 5 is a block diagram showing the main configuration of a display control device and electronic shelf label in the above embodiment.

FIG. 5 is a block diagram showing the main configuration of the display control device 7 and electronic shelf labels 8. The display control device 7 includes a CPU 31, ROM 32, RAM 33, timer 34, an interface 35 with the repeater 6, interfaces 36 with the respective electronic shelf labels 8 and the like.

Display data is output from each shelf label interface 36 to the article name display portion 21, list price display portion 22 and selling price display portion 23 of a corresponding one of the electronic shelf labels 8. Further, fingerprint data detected by the fingerprint detecting portion 24 of each electronic shelf label 8 is input to a corresponding one of the shelf label interfaces 36.

In the RAM 33, a shelf label display management table 41 and selling price display management table 42 are stored. As shown in FIG. 6, in the shelf label display management table 41, data of a shelf label interface number, article name, list price and selling price is stored for each shelf label ID. Further, as shown in FIG. 6, in the selling price display management table 42, data of accumulated points and display time is stored for each shelf label ID. The shelf label interface number is an inherent number set for each interface to identify each of the shelf label interfaces 36.

The store controller 1 performs the shelf label data distribution service before opening the store on every business day. That is, the store controller 1 reads out an article name, unit price and shelf label ID of each article from the article master table 10. Then, it forms a shelf label data transmission file by use of the readout data.

The shelf label data transmission file is transmitted from each transmitter/receiver unit 4 and received by the corresponding repeater 6. Then, the file is supplied to each of the display control devices 7 connected to the above repeaters 6.

The CPU 31 of each display control device 7 sequentially fetches data items of an article name, unit price and shelf label ID from the shelf label data transmission file. Each time data is fetched, it determines whether or not the shelf label ID is stored in the shelf label display management table 41. If the shelf label ID is not stored, the fetched data is discarded. If it is stored, the article name and unit price of the fetched data are stored into the article name area and list price area of the shelf label display management table 41 corresponding to the shelf label ID.

The article name data stored in the article name area is displayed on the article name display portion 21 of the electronic shelf label 8 specified by the corresponding shelf label ID. Further, unit price data stored in the list price area is displayed on the list price display portion 22 of the electronic shelf label 8 specified by the corresponding shelf label ID.

Figure 7:
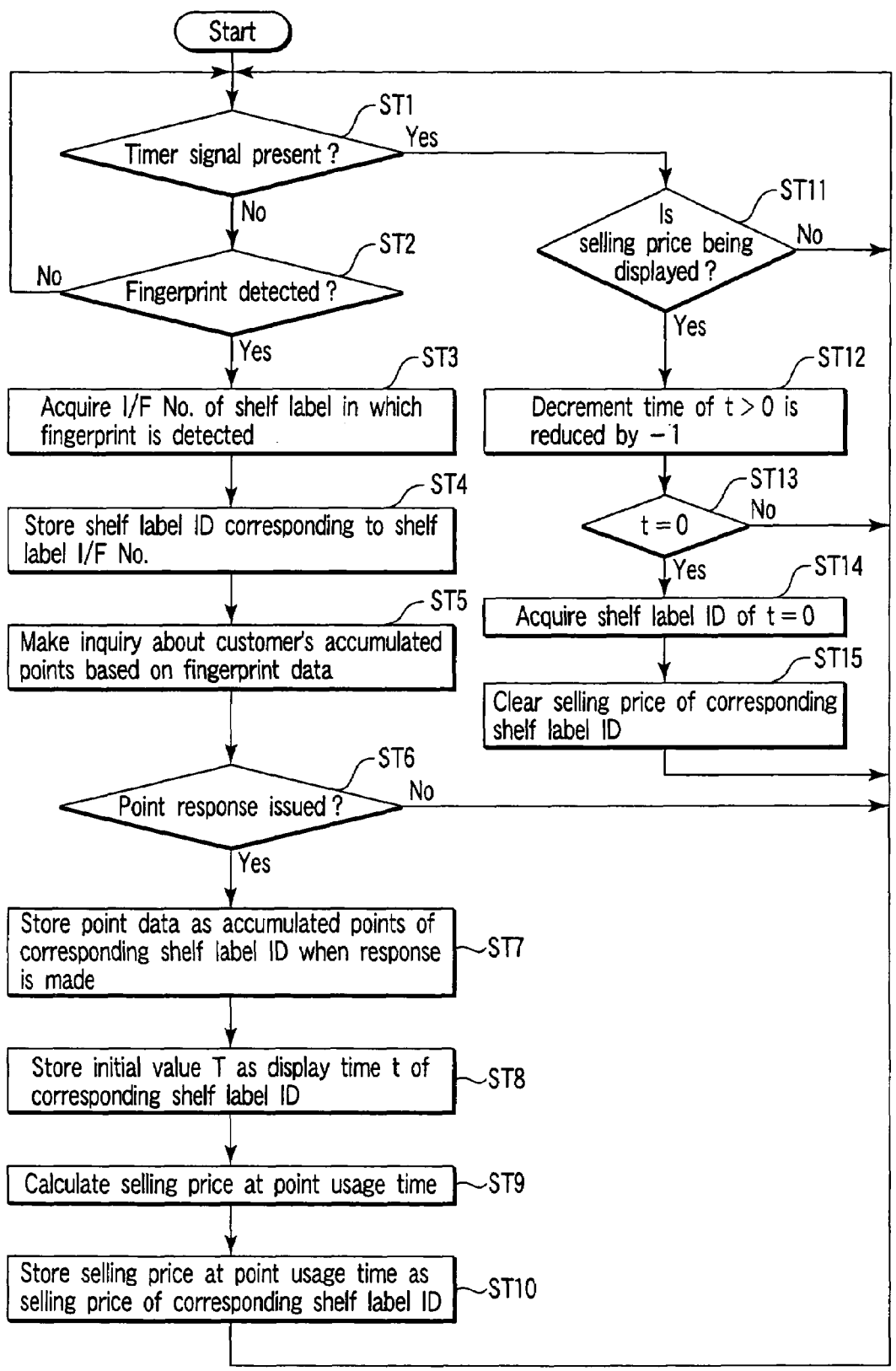
FIG. 7 is a flow chart showing the main processing procedure executed by a CPU of the display control device in the above embodiment.

After this, the CPU 31 of each display control device 7 performs the display control process according to the procedure shown in the flow chart of FIG. 7 until a store-closing signal is supplied from the store controller 1. That is, the CPU 31 waits for input of a timer signal from a timer 34 in the step ST1. The timer signal is output each time the timer 34 counts ten seconds, for example.

Further, the CPU 31 waits for detection of fingerprint data by the fingerprint detecting portion 24 of one of the electronic shelf labels 8 in the step ST2. If fingerprint data is input via the shelf label interface 36, the CPU 31 acquires the interface number of the shelf label interface 36 in the step ST3. When acquiring the interface number, the CPU 31 retrieves the shelf label display management table 41 in the step ST4. Then, it reads out shelf label ID set in correspondence to the interface number. The thus readout shelf label ID is stored in the work area of the RAM 33.

The CPU 31 forms point inquiry data in the step ST5. In the point inquiry data, fingerprint data input from the electronic shelf label 8 is contained. The point inquiry data is output to the repeater 6 via the repeater interface 36. Thus, the point inquiry data is transmitted by radio from the repeater 6 and fetched into the store controller 1 via the transmitter/receiver unit 4.

In the store controller 1, fingerprint data in the inquiry data is collated with fingerprint data stored in the customer master table 11. Then, if coincident fingerprint data is detected, accumulated point data stored together with the fingerprint data is read out from the customer master table 11. The accumulated point data thus read out is incorporated into point response data. The point response data is transmitted to the display control device 7 which is an inquiry source.

After transmitting the point inquiry data, the CPU 31 waits for point response data in the step ST6. When receiving point response data via the repeater 6, the CPU 31 stores point data of the point response data into the accumulated point area of the selling price display management table 42 corresponding to the shelf label ID stored in the work area in the step ST7. Further, it stores preset initial value data T into the display time area of the selling price display management table 42 corresponding to the shelf label ID in the step ST8. The initial value data T is set to a value of 1/10 of the actual display time when the timer signal is output at intervals of 10 seconds as described before.

The CPU 31 calculates a selling price when the points are used by use of the point data in the step ST9. In the present embodiment, one point is converted into one yen. Therefore, an amount corresponding to the total of the points is subtracted from the list price and the remaining amount becomes equal to the selling price when the points are used.

The CPU 31 stores the selling price when the points are used into the selling price area corresponding to the shelf label ID of the shelf label display management table 41 in the step ST10. Data stored in the selling price area is displayed on the selling price display portion 23 of the electronic shelf label 8 specified by the corresponding shelf label ID. After this, the CPU 31 waits until the timer signal is input or fingerprint data is detected.

If the timer signal is input, the CPU 31 determines whether or not the price is being displayed on the selling price display portion 23 of any one of the electronic shelf labels 8 in the step ST11. That is, the CPU 31 retrieves the selling price display management table 42 and checks whether a record that display time data t is larger than "0" is present or not. If even one record that display time data t is larger than "0" is present, the CPU 31 determines that the price is being displayed.

The CPU 31 counts down the display time data t of the record that display time data t is larger than "0" by "1" in the step ST12. Then, it determines whether the display time data t is set to "0" or not by the count-down operation in the step ST13. If it becomes "0", the CPU 31 acquires shelf label ID of a record that display time data t is set to "0" in the step ST14. After this, the CPU 31 clears the selling price data corresponding to the shelf label ID of the shelf display management table 41 in the step ST15. Thus, the selling price at the time of use of the points displayed on the selling prices display portion 23 of the electronic shelf label 8 is erased.

Thus, in the present embodiment, the selling price display portions 23 are provided on the electronic shelf labels 8 used to display the list prices and article names of the articles displayed on the article display shelf. Further, the fingerprint detecting portion 24 which detects fingerprint data or biometrics information of a customer is provided on each of the electronic shelf labels 8.

When fingerprint data is detected by use of the fingerprint detecting portion 24, a customer is specified by the fingerprint data. That is, a customer who faces the electronic shelf label 8 having the above fingerprint detecting portion 24 provided thereon is specified. If the customer is thus specified, the accumulated point data of the customer at the present time is read out from the customer table 11. Then, if the accumulated points are used for payment for an article displayed on the electronic shelf label 8, the remaining amount is calculated. The remaining amount is displayed on the selling price display portion 23 of the electronic shelf label 8 as the selling price at the time of use of the points.

Figure 8:
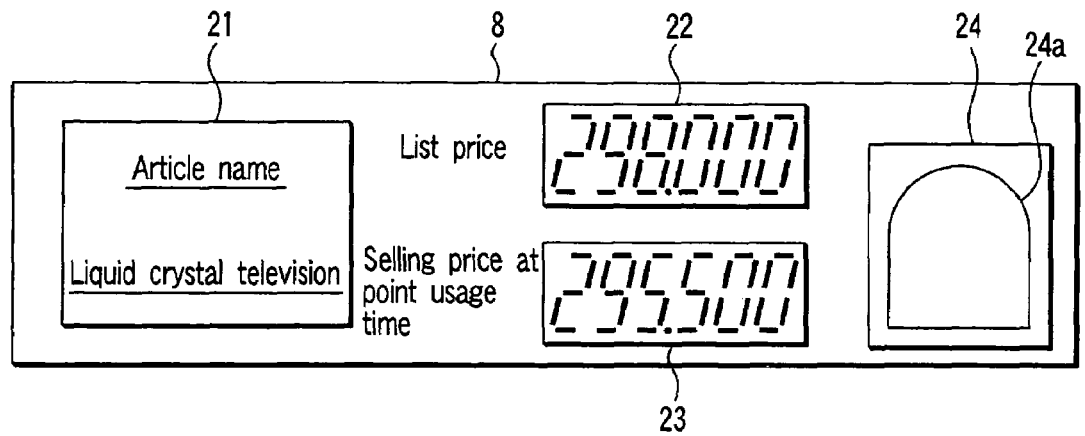
FIG. 8 is a plan view showing one example of display of an electronic shelf label.

FIG. 8 shows one display example of the electronic shelf label 8 having the selling price display portion 23 on which the selling price at the time of use of the points is displayed. In this example, the accumulated points of the customer specified by the fingerprint data are 2500 points. Therefore, 295,500 yen is displayed as the selling price at the time of use of the points for the list price 298,000 yen.

Thus, the customer can instantly find out the selling price at the time of use of the points simply by causing his own fingerprint to be read by the electronic shelf label 8 displaying the article name of an article which he wants to purchase. At this time, the list price and the selling price at the time of use of the points are displayed side by side on the electronic shelf label 8. Therefore, it is strongly appealed to the customer that the price is reduced by using the points.

Figure 9:
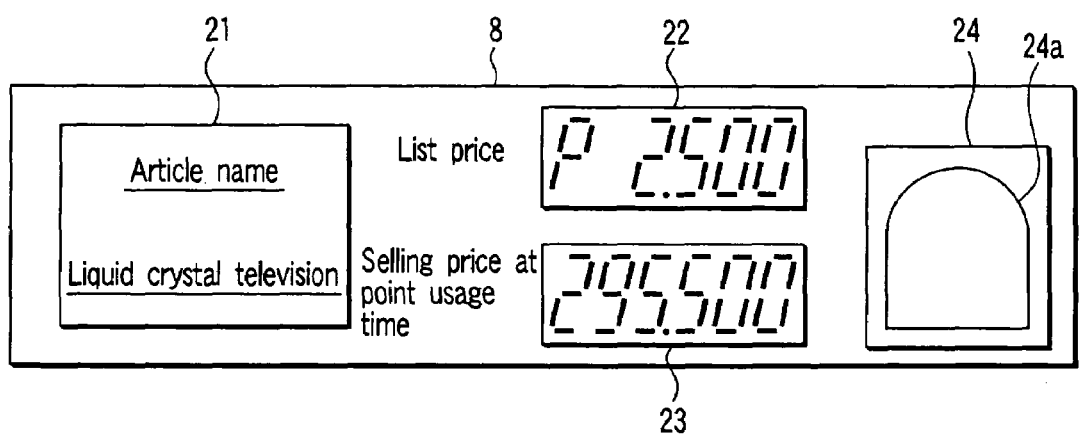
FIG. 9 is a plan view showing another example of display of the electronic shelf label.

As shown in FIG. 9, when the selling price at the time of use of the points is displayed on the selling price display portion 23, the accumulated points at the present time may be displayed on the list price display portion 22. For this purpose, the following process is additionally performed after the process of the step ST10 of FIG. 7. First, list price data stored in the list price area corresponding to the shelf label ID of the shelf label display management table 41 is temporarily saved into a saving memory. Then, the accumulated points corresponding to the same shelf label ID of the selling price display management table 42 is stored in the list price area. Thus, the accumulated points at the present time can be simultaneously informed to the customer who wants to recognize the selling price at the time of use of the points.

Further, in the case of FIG. 9, the newest accumulated points when the customer purchases an article without using the points may be displayed on the selling price display portion 23. For this purpose, the point calculating function which the normal POS terminal 2 has is provided in the display control device 7. Then, the CPU 31 of the display control device 7 calculates points based on list price data stored in the list price area of the shelf label display management table 41.

The thus calculated points are added to the accumulated points of the selling price display management table 42. The CPU 31 stores point data obtained after addition into the selling price area of the shelf label display management table 41. Thus, the newest accumulated points when purchasing the article can be previously informed to the customer.

Next, a second embodiment of this invention is explained. The present embodiment indicates a case wherein an article information display system according to this invention is applied to a sales store which provides discount service according to the ranks of customers determined based on the degrees of contribution to the store such as the purchasing performance or the like.

In the second embodiment, the system configuration of the sales store, the configuration of an electronic shelf label 8 and the hardware configuration of a display control device 7 are the same as those of the first embodiment. The same portions as those of the first embodiment are denoted by the same reference symbols and the explanation thereof is omitted.

Figures 10, 11:
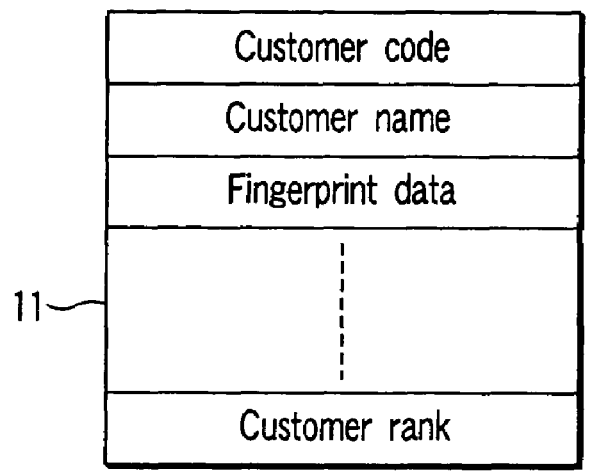
FIG. 10 is a schematic diagram showing the main data structure of a customer master table in a second embodiment of this invention.
FIG. 11 is a schematic diagram showing the data structure of a ranked discount rate table formed in a RAM of the display control device in the second embodiment.

In the second embodiment, part of customer information stored in a customer master table 11 is different. That is, as shown in FIG. 10, customer rank data is stored instead of the accumulated point data. The customer rank data is adequately ranked up or down according to the purchasing performance or the like of the customer.

Further, in the second embodiment, a ranked discount rate table 43 is provided in a RAM 33 of the display control device 7. As shown in FIG. 11, in the ranked discount rate table 43, desired discount rates are set in correspondence to respective customer's ranks. In this example, the accumulated point area of the selling price display management table 42 is used as a customer's rank area.

Figure 12:
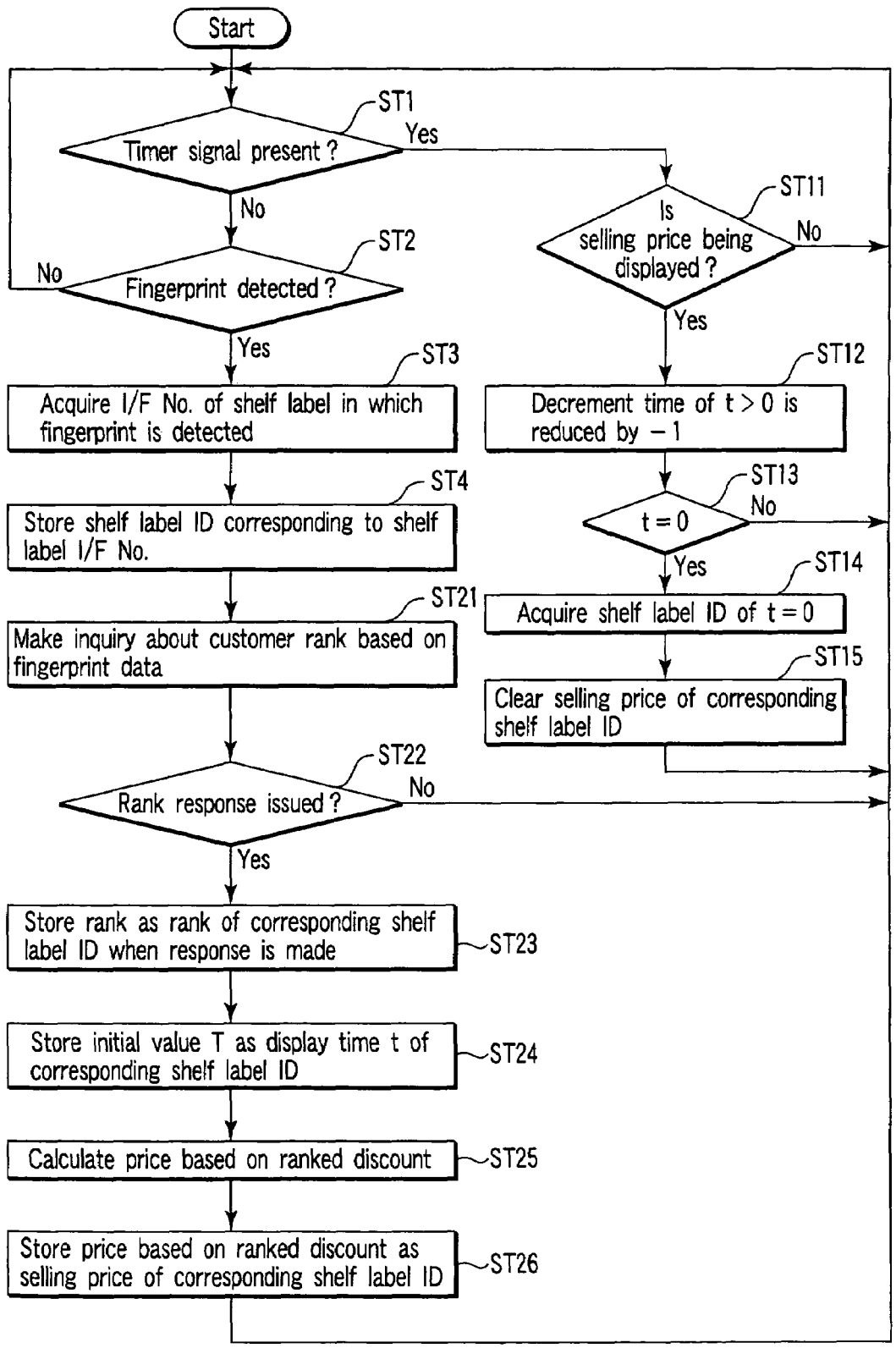
FIG. 12 is a flow chart showing the main processing procedure executed by a CPU of the display control device in the second embodiment.

A CPU 31 of each display control device 7 performs the display control process according to the procedure shown in the flow chart of FIG. 12 until a store-closing signal is supplied thereto from a store controller 1. The process is different from the process of the first embodiment in the steps ST5 to ST10.

When storing a shelf label ID of an electronic shelf label 8 in which fingerprint data is detected into the work area in the step ST4, the CPU 31 forms rank inquiry data in the step ST21. The rank inquiry data contains fingerprint data input from the corresponding electronic shelf label 8. The rank inquiry data is output to a corresponding repeater 6 via a repeater interface 36. Thus, the rank inquiry data is transmitted by radio from the repeater 6 and fetched into the store controller 1 via a corresponding one of transmitter/receiver units 4.

In the store controller 1, fingerprint data in the inquiry data is collated with fingerprint data stored in the customer master table 11. Then, if coincident fingerprint data is detected, customer's rank data stored together with the fingerprint data is read out from the customer master table 11. The customer's rank data thus read out is incorporated into rank response data. The rank response data is transmitted to the display control device 7 which is an inquiry source.

After transmitting the rank inquiry data, the CPU 31 waits for rank response data in the step ST22. When receiving rank response data via the repeater 6, the CPU 31 stores customer's rank data of the rank response data into the customer's rank area of the selling price display management table 42 corresponding to the shelf label ID stored in the work area in the step ST23. Further, it stores preset initial value data T into the display time area of the selling price display management table 42 corresponding to the shelf label ID in the step ST24.

The CPU 31 calculates a price obtained after the discount is made based on the rank by use of the customer's rank data in the step ST25. That is, the discount rate corresponding to the customer's rank data is acquired from the ranked discount rate table 43. Then, a price after the ranked discount is calculated according to the discount rate and list price data stored in the shelf label display management table 41.

The CPU 31 stores the selling price after the ranked discount into the selling price area corresponding to the shelf label ID of the shelf label display management table 41 in the step ST26. Data stored in the selling price area is displayed on the selling price display portion 23 of the electronic shelf label 8 specified by the corresponding shelf label ID.

Thus, the customer can instantly find out the article price after the discount is made based on his rank at the present time simply by causing his own fingerprint to be read by the electronic shelf label 8 which displays the article name of an article which he wants to purchase.

This invention is not directly limited to the above embodiments and the constituents thereof can be variously modified and embodied without departing from the technical scope thereof at the embodying stage.

For example, the detecting portion which detects information inherent to the individual is not limited to the fingerprint detecting portion 24. As biometrics information used for biometrics, a palm print, hand print, vein, iris, face and the like are known. A detecting portion which detects the above biometrics information may be provided on the electronic shelf label 8.

Further, the detecting portion may be designed to detect a storage medium inherent to the individual. For example, as the storage medium, a membership card, Radio Frequency Identification (RFID) tag or the like is considered.

Figure 13:
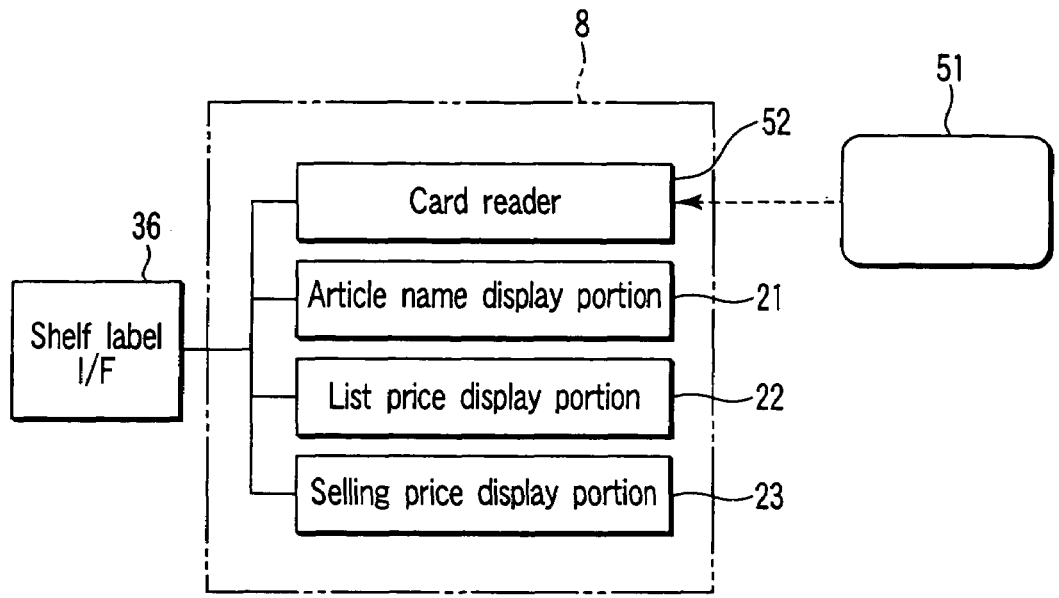
FIG. 13 is a block diagram showing another embodiment of the electronic shelf label.

FIG. 13 shows an example in which a card reader 52 capable of reading card data such as a member's number recorded on a membership card 51 is provided on the electronic shelf label 8.

Figure 14:
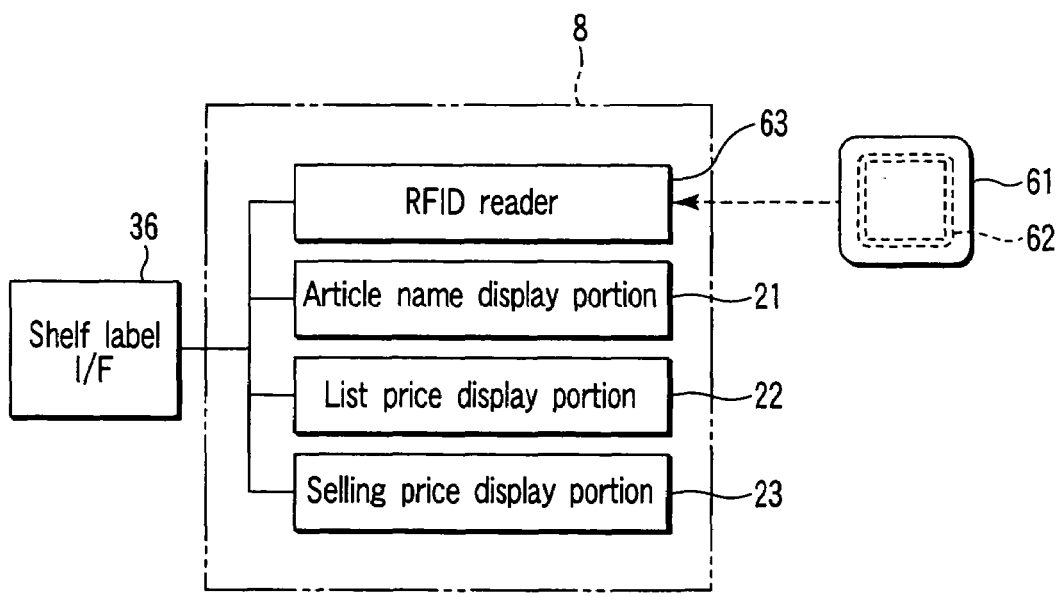
FIG. 14 is a block diagram showing a further embodiment of the electronic shelf label.

FIG. 14 shows an example in which an RFID reader 63 capable of reading tag ID from an RFID tag 62 contained in the medium in a non-contact fashion is provided on the electronic shelf label 8.

In the above embodiments, the customer table 11 is provided outside the display control device 7. However, in a system in which all of the electronic shelf labels 8 are controlled by one display control device 7, the customer master table 11 may be stored in the storage device of the display control device 7. Thus, the authentication process of a customer whose biometrics information is detected can be performed in the display control device 7. Therefore, the effect that the processing time can be reduced and the load of the store controller 1 can be alleviated or the like can be attained.

Further, in the above embodiments, the selling price display portion 23 is provided together with the list price display portion 22 on the electronic shelf label 8. However, the selling price display portion 22 can be omitted and the user price may be displayed on the list price display portion 22.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article information display system comprising:

a plurality of electronic shelf labels provided for respective articles displayed on an article display shelf to display at least price information items of corresponding articles, and a display control device which controls the display information of the electronic shelf labels, wherein the electronic shelf labels include detecting portions which detect information items inherent to individuals, and the display control device includes:

a storage portion which stores information items inherent to respective customers and a parameter used to calculate an article price for an individual customer, a customer specifying portion which specifies a customer by referring to the storage portion by use of inherent information detected by the detecting portion of the electronic shelf label and acquires the parameter used to calculate the article price for the individual customer, an information acquiring portion which calculates the article price for the customer from the price information of the article displayed on the electronic shelf labels and the parameter as information displayed for the customer specified by the customer specifying portion, and a display control portion which causes the article price calculated by the information acquiring portion to be displayed on the electronic shelf label which has detected information inherent to the customer specified by the customer specifying portion;

wherein service point data items given to the respective customers are stored in the storage portion as the parameter, and a remaining amount after using the service point data is calculated by the information acquiring portion.

2. The article information display system according to claim 1, wherein the plurality of electronic shelf labels further includes a list price display portion which display a list price of an article, and a sales price display portion which displays a sales price of an article, and a display control portion which causes the remaining amount when the service point data are used, the displayed on the sales price display portion, and the service point data to be display on the list price display portion.

3. The article information display system according to claim 1, wherein the detecting portion detects living body information used for authentication of an individual, and the living body information is stored in the storage portion as the inherent information for each customer.

4. The article information display system according to claim 3, wherein the biometrics information used for authentication of an individual is fingerprint information.

* * * * *

UNITED STATES PATENT AND TRADEMARK OFFICE
CERTIFICATE OF CORRECTION

PATENT NO. : 7,651,026 B2
APPLICATION NO. : 11/449789
DATED : January 26, 2010
INVENTOR(S) : Takeshi Nagamachi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-third Day of November, 2010

David J. Kappos
*Director of the United States Patent and Trademark Office*